United States Patent Office 2,872,449
Patented Feb. 3, 1959

2,872,449

PRODUCTION OF AZO DYESTUFF CATIONS

Hans Baumann and Emil Kern, Ludwigshafen (Rhine), Germany, assignors to Badische Anilin- & Soda-Fabrik Aktiengesellschaft, Ludwigshafen (Rhine), Germany No Drawing. Application July 2, 1957
Serial No. 669,461

Claims priority, application Germany July 4, 1956

6 Claims. (Cl. 260—157)

This invention relates to the production of new azo dyestuff cations and especially of new diazacyanine dyestuff cations.

The new dyestuff cations have the general formula

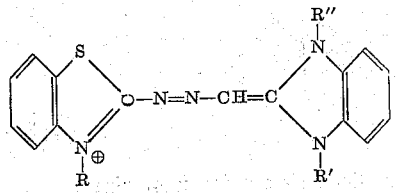

wherein R and R' represent alkyl, cycloalkyl, aralkyl and aryl radicals containing not more than 10 carbon atoms and R" is an alkyl, cycloalkyl or aralkyl radical containing not more than 10 carbon atoms; they form salts with any inorganic or organic anions. The benzene nuclei in the dyestuff cations may contain one or more substantially neutral substituents, such as halogen atoms or alkyl, alkoxy, oxyalkyl, carbalkoxy, carbon amido, sulfonamido, alkylsulfonyl, cyano, acylamino or nitro groups.

The new dyestuff cations can be obtained by condensing benzthiazolone-(2)-hydrazones of the general Formula I

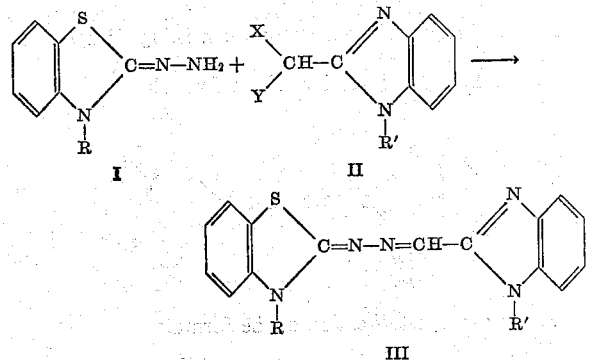

wherein R is an alkyl, cycloalkyl, aryl or aralkyl group containing no more than 10 carbon atoms, with a benzimidazole of the general Formula II, wherein R' is a hydrogen atom or an alkyl, cycloalkyl, aryl or aralkyl group containing no more than 10 carbon atoms and X and Y represent halogen atoms or alkoxy groups or, together, a doubly-combined oxygen atom, and reacting the resultant condensation products of the general Formula III wherein R and R' have the above mentioned meaning with alkylating, cycloalkylating or aralkylating agents to quaternary ammonium compounds, wherein the new dyestuff cations are combined with inorganic or organic anions.

Initial substances of the Formula I are for example 3-methylbenzthiazolone-(2)-hydrazone and its derivatives substituted in the benzene nucleus by substantially neutral substituents of the said kind and the corresponding N-ethyl, N-cyclohexyl, N-benzyl or N-phenyl derivatives.

As initial materials of the Formula II there may be mentioned among others benzimidazole-2-aldehyde, 2-(dichloromethyl)- or 2-(dimethoxy methyl)-benzimidazole, their derivatives substituted on the 1-position by methyl, ethyl, cyclohexyl, benzyl or phenyl groups and the derivatives of these compounds substituted by substantially neutral substituents in the abovementioned sense.

The condensation of the initial materials I and II to the product III in most cases already takes place at normal temperatures; it can be carried out by reacting the components, preferably in equimolecular amounts, in aqueous solution or suspension or in an inert solvent. The addition of condensing agents mostly is not necessary. Sometimes heating up to temperatures of about 120° C., preferably 60–100° C., is advantageous.

For the conversion of the condensation products III into the quaternary ammonium compounds they can be reacted either in the melted state or in a solution or suspension in an inert solvent with alkylating, cycloalkylating or aralkylating agents, such as alkyl, cycloalkyl or aralkyl halogenides, dialkyl sulfates or alkyl esters of organic sulfonic acids. The most favorable alkylation temperatures and periods depend on the compounds respectively used and may easily be ascertained by preliminary experiment. The alkylation takes place at the N-atom in the position 3 of the benzimidazole ring in Formula III which bears no substituents; if R' is hydrogen, alkylation also takes place there, i. e. in the position 1 of the benzimidazole ring. The dyestuff cations so obtained form salts with inorganic or organic anions as for example those of the halogen hydracids, sulfuric and alkyl sulfuric acids, para-toluenesulfonic and perchloric acid.

The new azo dyestuff cations obtained in very good yields in the manner described dissolve in water and in many organic solvents with clear greenish to reddish yellow color; the shade of color is constant within a wide pH range.

The new dyestuff cations may serve for dyeing tanned cotton, wool, silk, leather, cellulose esters, polyamide and polyurethane fibres, and also for coloring lacquers; furthermore they can be reacted with heteropoly acids to form pigments. Their dyeings exhibit in ultra-violet light a yellow-green fluorescence which in many cases is very powerful.

The following examples will further illustrate this invention but the invention is not restricted to these examples. The parts specified in the examples are parts by weight.

Example 1

17.9 parts of 3-methylbenzthiazolone-(2)-hydrazone and 18.1 parts of 5-chlorobenzimidazole-2-aldehyde are stirred with 200 parts of dimethyl formamide for an hour at 80° C. After adding 50 parts of dimethyl sulfate the reaction mixture is heated for three hours at 120° C. Upon cooling, yellow crystals separate out. It is diluted with an equal volume of ice-water, filtered by suction, washed with ice-water on the filter and dried.

31 parts of the salt of the dyestuff cation of the formula

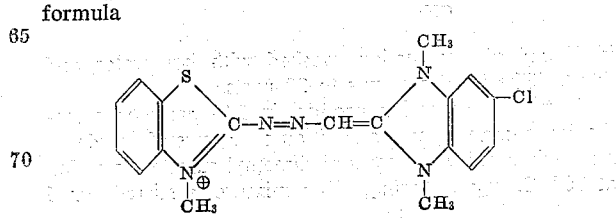

combined with the methylsulfate anion are obtained; it dissolves in water with a pure yellow color. The shade of color of the solution does not change upon the addition of ammonia, or dilute hydrochloric acid.

A similar dyestuff is obtained by reacting 3-ethylbenzthiazolone-(2)-hydrazone with the said benzimidazol derivative.

By using 3-methyl-6-methoxy-benzthiazolone-(2)-hydrazone as the hydrazone component, a dyestuff is obtained which dissolves in water with a reddish-yellow color.

*Example 2*

17.9 parts of 3-methylbenzthiazolone-(2)-hydrazone and 14.6 parts of benzimidazole-2-aldehyde are heated to 80° C. in 300 parts of formamide while stirring until the condensation product has separated in crystalline form. 6 parts of magnesium oxide and 38 parts of benzyl chloride are added and heated for about 4 hours at 110° C. until a papyrographic unitary yellow dyestuff has been formed.

It is diluted with the same volume of water, excess benzyl chloride is expelled with steam and the precipitate which separates after cooling is filtered off by suction. The yield amounts to 34.5 parts. It is a salt of the dyestuff cation of the formula

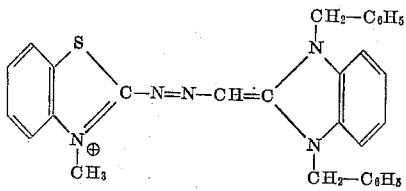

and the chloro anion and dissolves in aqueous alcohol or in acetone with a yellow color.

An analogous dyestuff, which however dissolves in water with a greenish-yellow color, is obtained by carrying out the alkylation with dimethyl sulfate instead of benzyl chloride.

If in each case the corresponding amount of 2-dichlormethyl-benzimidazole is used instead of the benzimidazole-2-aldehyde, the same dyestuffs are obtained in similar good yields.

If 3-methyl-6-methoxy-benzthiazolone-(2)-hydrazone instead of the 3-methyl compound is used in the manner described in this example, a yellowish-orange dyestuff is obtained.

*Example 3*

A water-moist paste of 2-dichlormethyl-benzimidazole hydrochloride, which corresponds to 22 parts of 2-dichlormethyl-benzimidazole, is introduced while stirring at 70° C. into a solution of 21.6 parts of 3-methylbenzthiazolone-(2)-hydrazone hydrochloride in 500 parts of water, and such an amount of caustic soda solution is allowed to flow in gradually as is necessary to neutralize the hydrogen chloride combined as salt and formed during the condensation. The precipitated pale yellow condensation product of the formula

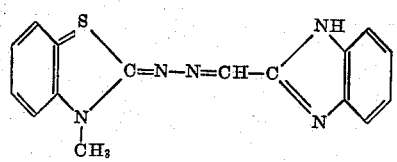

is filtered off by suction, washed with hot water and dried. The yield amounts to 30 parts.

To this condensation product in 240 parts of orthodichlorbenzene, after the addition of 4 parts of powdered magnesium oxide, 25 parts of dimethyl sulfate are added at 70° C. while stirring. The mixture is stirred for 6 hours on a boiling waterbath and then allowed to cool. The dyestuff formed is filtered off by suction, washed with benzene and dried. 45 parts of the salt of the greenish-yellow dyestuff cation of the formula

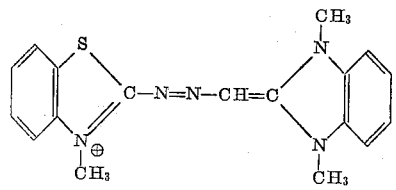

and the methylsulfate anion are obtained

The use of 3-ethylbenzthiazolone-(2)-hydrazone hydrochloride instead of the 3-methyl compound yields a similar dyestuff.

If 3-methyl-6-methoxy-benzthiazolone-(2)-hydrazone instead of 3-methylbenzthiazolone-(2)-hydrazone is used in the manner described, the salt of the reddish-yellow dyestuff cation of the formula

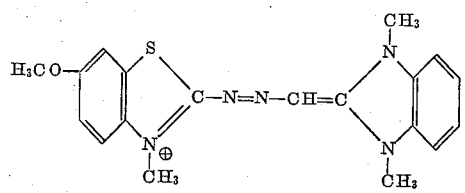

and the methylsulfate anion is obtained.

What we claim is:

1. An azo dyestuff cation of the formula

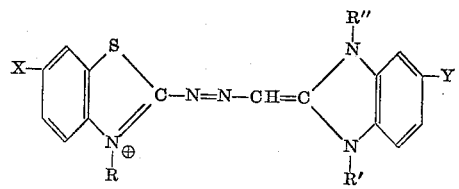

wherein R is a lower saturated alkyl radical, R' and R'' each are a member of the group consisting of lower saturated alkyl and lower aralkyl groups, X is a member of the group consisting of hydrogen and a methoxy group and Y is a member of the group consisting of hydrogen and chlorine.

2. An azo dyestuff cation of the formula

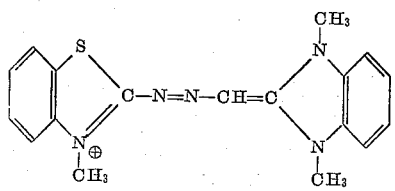

3. An azo dyestuff cation of the formula

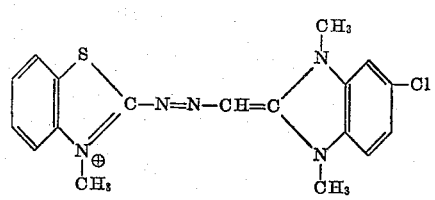

4. An azo dyestuff cation of the formula

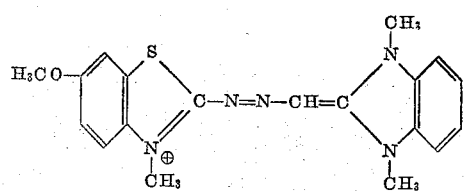

5. An azo dyestuff cation of the formula
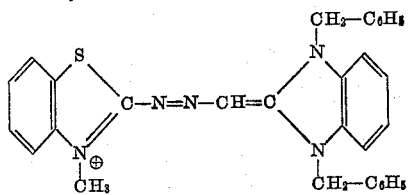
6. An azo dyestuff cation of the formula
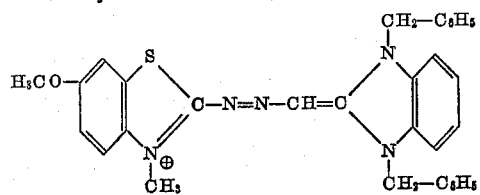
References Cited in the file of this patent
UNITED STATES PATENTS
| | | |
|---|---|---|
| 2,710,823 | Katz | June 14, 1955 |
| 2,767,174 | Katz et al. | Oct. 16, 1956 |
| 2,815,338 | Ruegg | Dec. 3, 1957 |